Patented Aug. 22, 1933

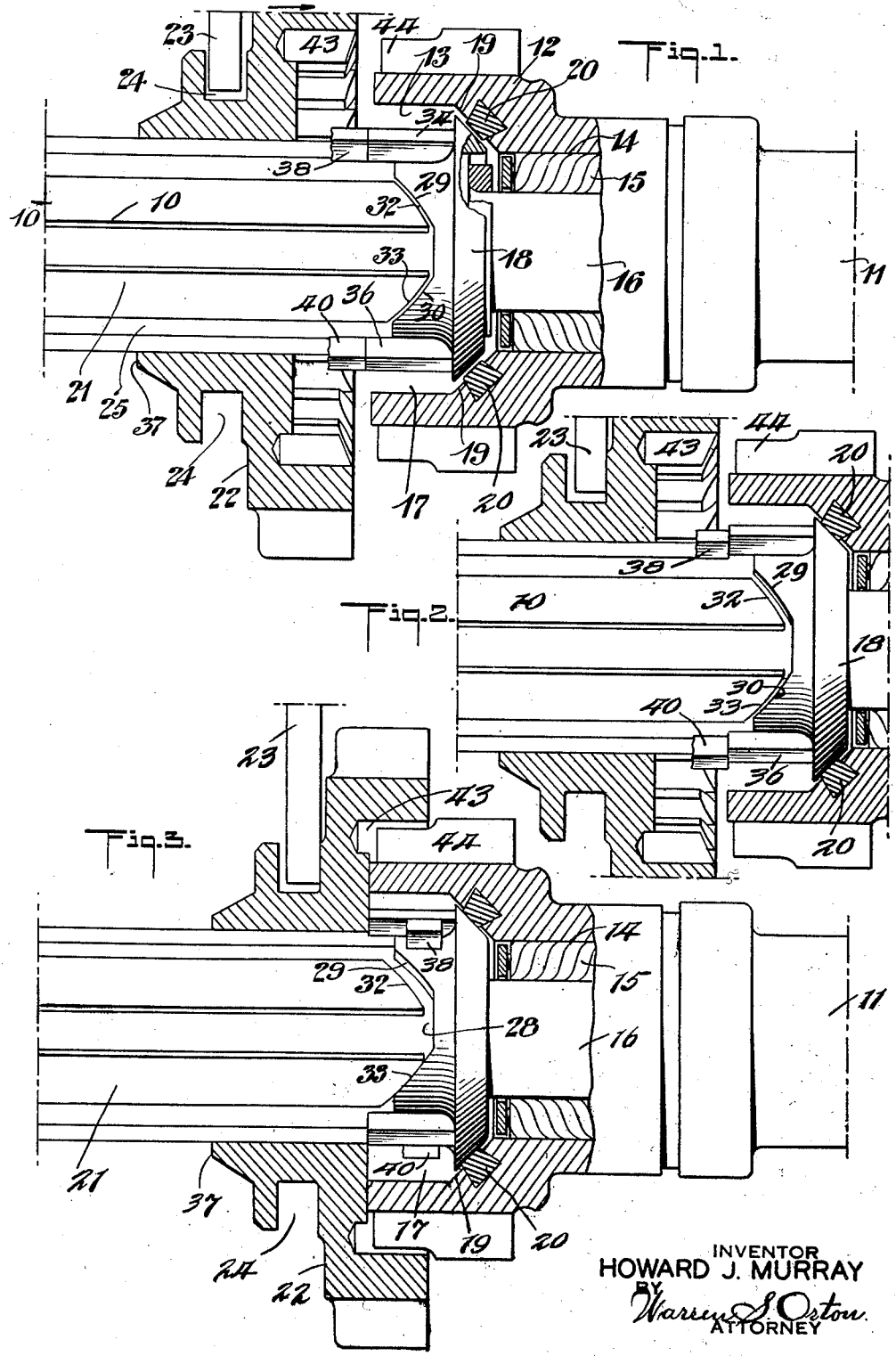

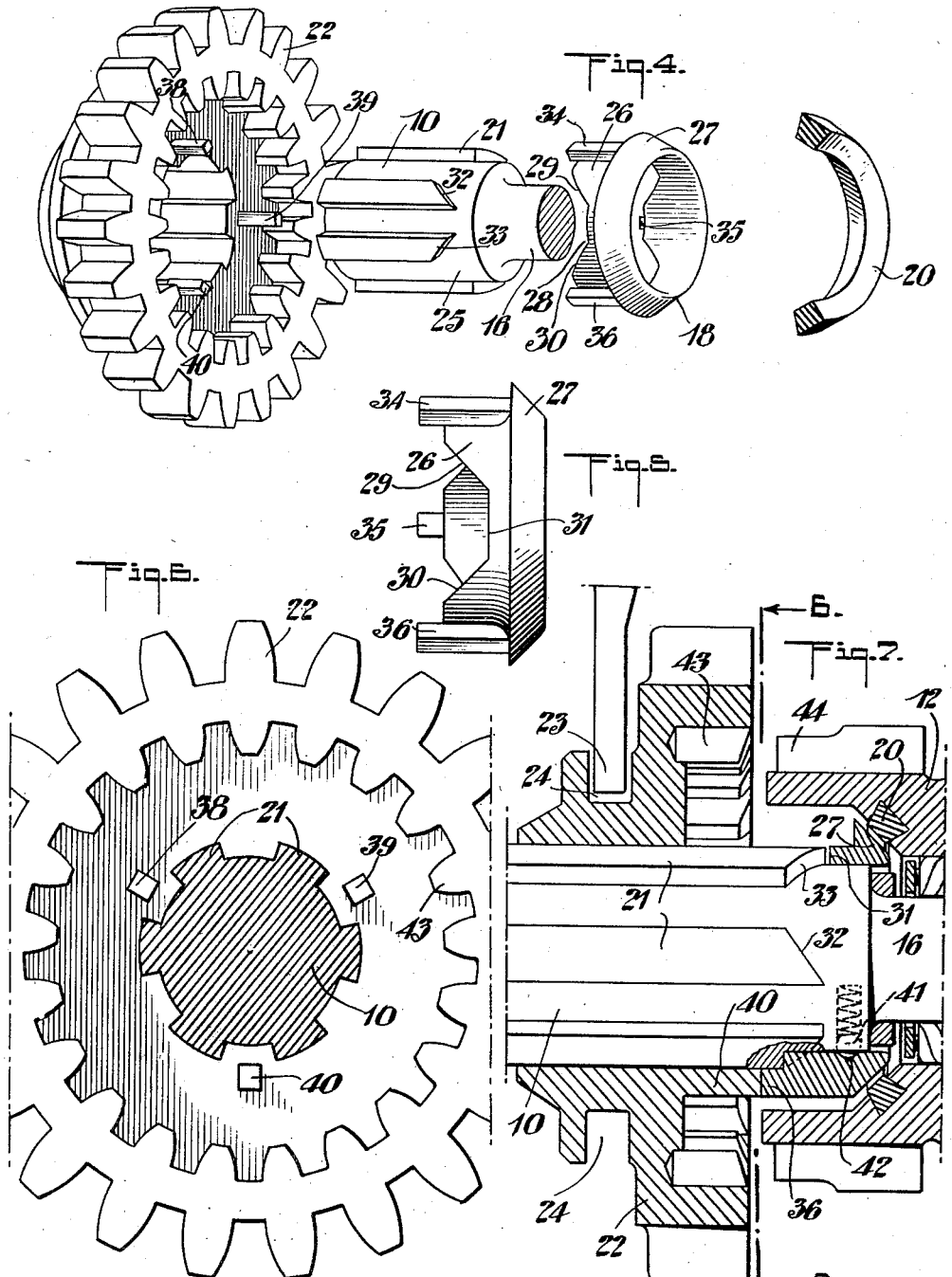

1,923,385

UNITED STATES PATENT OFFICE 1,923,385

SPRINGLESS CLUTCH SYNCHRONIZER

Howard J. Murray, New York, N. Y., assignor to R. M. Company Inc., East Pittsburgh, Pa., a Corporation of Delaware Application October 17, 1928. Serial No. 313,175

6 Claims. (Cl. 192—53)

The invention relates to a synchronizing device for causing a pair of clutch elements or other power transmitting members to approach the same speed before they are moved into their meshing or interdriving relation, and the present disclosure constitutes an improvement over the similar structure shown in my copending application Serial No. 50,279 filed August 14, 1925, in that the clutch elements are forced into a frictional driving connection through a synchronizing ring positioned between the elements before they are mechanically connected and which synchronizing ring is caused to function through the agency of camming means which act incidental to relative rotary movement between the synchronizing ring and the shaft on which it and one of the elements are mounted.

In the construction disclosed in the above identified application, the synchronizing device was shifted into its initial frictional engagement with one of the clutch elements by means of a resilient overrunning engagement between the synchronizer and the other clutch element. Such resilient engagement necessarily involved the use of a spring, in the above application referred to as a deterrent spring. Such spring constructions have the inherent defect characterizing mechanisms which depend upon metal springs for their operation in that the springs lose their resiliency and otherwise become inoperative. Such failure is very apt to occur in devices of the class herein disclosed and where heavy torque forces are transferred rapidly and repeatedly through metal springs.

Accordingly, one of the objects of the present invention is to provide a simplified form of synchronizing device which will have all of the virtues, such as a powerfully acting frictional clutching engagement between the clutching members as is recited in the preceding application, and at the same time to avoid the disadvantages inherent in the use of springs.

Still another object of the invention and featuring economy in manufacturing costs is to provide a synchronizing device which can be readily constructed with all the requisite accuracy of dimension necessary in such structures by means of the ordinary machining operations commonly used in forming metal cylinders, and which will be free of re-entrance angles or other difficultly machined recesses.

Still another object of the invention is to provide a form of synchronizer which will have a relatively long bearing on the shaft or other part on which it is mounted so as to thus reduce possibility of wear due to loose or other inaccurately fitted parts. At the same time, the disclosure features the providing of such long bearings as will insure a smooth action of relatively movable parts without necessity of increasing the all-over dimension of the construction over the sizes of the corresponding parts in the form illustrated in the preceding application.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Fig. 1 is a view in axial cross section of a pair of clutch jaws of the type commonly found in automotive vehicle transmissions equipped with a synchronizer coacting therewith to constitute a preferred embodiment of the invention and showing the parts in their unclutched relation and showing the synchronizer ring partially in section;

Fig. 2 is a similar view showing the relation of the parts at the initial manual shifting of the synchronizer ring and just prior to the cam actuated shifting of the ring;

Fig. 3 is a view of the parts with the clutch elements in their final interdriving relation and the synchronizer ring idle;

Fig. 4 is an axially exploded view of the sliding gear, its shaft and the synchronizer ring;

Fig. 5 is a view in side elevation of the synchronizer ring;

Fig. 6 is a mutilated view in cross section and taken on the line 6—6 of Fig. 7; and Fig. 7 is a view similar to Fig. 1 showing the synchronizer in section.

In the drawings there is shown two power shafts 10 and 11 in axial alignment. Secured to the telescoped end of shaft 11 is a clutch element 12 constituting an axially fixed element of a mechanical clutch and referred to hereinafter as the male clutch element or jaw. The element 12 is provided with a bore 13 having an inner reduced portion 14 adapted to receive a bearing 15 for mounting the inner end 16 of the shaft 10 and an enlarged portion 17 for receiving the synchronizer ring 18 hereinafter described and sometimes referred to as a synchronizer. The shoulder 19 formed between the reduced and enlarged portions of the bore is inclined towards the axis of the shaft to provide one of the conical faces of a friction clutch of the cone type hereinafter described. It is suggested that if desired a removable insert friction member 20 preferably a composition ring may be contained in one of the faces of the friction clutch. The shaft 10 is provided with splines 21 slidably mounted on which is a shiftable clutch element 22 referred to hereinafter as the female clutch element or jaw and which telescopes over the male element 12 as the clutch element 22 is shifted from left to right of the position shown in Fig. 1 by the actuation of a yoke shift fork 23 engaging in a peripheral groove 24.

The synchronizer ring 18 is mounted on the unreduced cylindrical portion of the shaft 10 and disposed on a smooth bearing portion 25 for a limited rotary movement between the end of the unreduced portion and the adjacent ends of the splines 21. The synchronizer ring is somewhat in the form of a cylinder and is contained for the most part within the enlarged portion 17 of the bore. The ring includes a cylindrical body portion 26 with the end facing the shoulder 19 enlarged and forming a conical friction face 27 designed to coact with the correspondingly beveled face of the friction member 20 to form a friction clutch of the cone type between the synchronizer ring 18 and the element 12. The synchronizer ring 18 also constitutes a camming ring and is designed to cause a shifting action of the ring into frictional engagement with the element 12 whenever the shaft 10 tends to rotate past the synchronizer. When ring 18 becomes clutched to element 12 it tends to ride past the shaft with its element 22 splined thereto. The edge of the cylindrical body portion 26 facing the member 22 is provided with circumferentially spaced recesses 28 which are defined by circumferentially spaced apart inclined sides 29 and 30 and a straight connecting side 31. Each recess 28, three of which are shown, contains the adjacent ends of two of the six splines 21. Each pair of spline ends is beveled back from the recess in opposite direction to form cams 32 and 33 to coact respectively with the sides 29 and 30 to form camming means for axially shifting the camming ring 18 as the shaft 10 tends to rotate past the synchronizer ring in either of its rotary directions. For the purpose of causing the initial clutching of the synchronizer with the element 12, means are provided for causing a part of the shiftable element 22 to bear on the synchronizer and acting therethrough to force the synchronizer into its clutching engagement with the element 12. The outer side of the cylindrical body portion 26 is provided with three longitudinally extending and equally spaced apart ribs 34, 35 and 36 which —as shown in Fig. 5 project slightly beyond the recessed edge of the portion 26 and are centered between the recesses 28 and overlap the splines. This disposition of the ribs causes them to extend into the three troughs between the pairs of splines the ends of which form the three camming devices. The hub portion 37 of the sliding unit 22 is provided with three fingers 38, 39 and 40 which project therefrom slightly beyond its outline as shown in Figs. 1 and 7 and are designed to contact endwise respectively with the ends of the ribs 34, 35 and 36. Spring pressed detents of which one is shown at 41 in Fig. 7 carried by the shaft 10 act on the sides of recess 42 formed in the inner periphery of ring 18 and tend to maintain the synchronizer ring in its normal inactive declutched position. From this construction it will be apparent that any tendency to rotary movement between the synchronizer and the shaft on which it is journalled and in either direction will cause a shifting of the synchronizer axially into interclutching engagement with the element 12.

In operation and assuming that the parts are normally in the unmeshed, inoperative condition shown in Figs. 1 and 7, the operator engaging the usual shift rod actuates the same in the instant case to shift the fork 23 from the position shown in Fig. 1 towards the right as indicated by the arrow and into the position shown in Fig. 2. This will cause the fingers 38, 39, 40 on the shiftable element 22 to bear against the ends of the projected ribs 34, 35 and 36 to shift the synchronizer ring from the position shown in Fig. 1 towards the right and into a relatively light clutching engagement with the element 12 as shown in Fig. 2. During this action, the spring pressed detents 41 will be forced into their containing recesses and out of the retardant recesses 42 thus permitting the ring to move axially. This will cause the synchronizer ring to be clutched frictionally to the element 12 thus causing the synchronizer to turn with the element. Assuming that 12 is turning at a different speed from the shaft 10, it will mean that either the shaft or synchronizer ring will tend to overrun the other, thus causing the cam mechanism to force the synchronizer ring with a powerful intensity into frictional engagement with the element 12. This tends to synchronize the speeds of the shafts 10 and 11 causing them to approach the same speed.

The tendency of the synchronizer ring to rotate relative to the element 22 will be sufficient to shift the fingers 38, 39 and 40 circumferentially to clear the opposing ribs 34, 35 and 36 and thus permit the element 22 to continue its left to right movement and until the teeth 43 and 44 are in their telescoped mechanical driving connection as shown in Fig. 3.

Should it be desired to unclutch these elements 12 and 22 it is simply necessary to actuate the shift lever 23 in the direction opposite to the direction indicated by the arrow or from right to left and the gears are pulled apart into the unmeshed position shown in Fig. 1 and the parts are thus restored to their initial position.

It is noted that by means of the device disclosed, it is possible to utilize the relative rotary force between the power shafts 10 and 11 for effecting the synchronizing of the members to be interengaged. It is appreciated that the manual effort imposed on the shift fork 23 is required to be of no greater force than is necessary to shift the element 22 and the synchronizer ring 18 into its relatively light clutching engagement with the element 12 as shown in Fig. 2. As the shiftable element makes direct bearing engagement with the synchronizer ring there is no necessity of the resilient deterrent construction characterizing previously known constructions and the device disclosed will function indefinitely and independent of any action dependent upon a spring.

I claim:

1. In a device of the class described, the combination of a shaft provided with splines bevelled at one end to form cams, an element of a mechanical clutch splined to and slidable on the shaft, a relatively fixed coacting clutch element mounted for rotary movement about the axis of said shaft, means for causing the elements to approach the same speed, said means including a synchronizer ring provided with a cylindrical body portion mounted on the shaft, one end of said body portion provided with recesses containing said cams, the opposite end of said body portion and the fixed element provided with coacting friction clutch faces, said slidable element provided with a plurality of circumferentially spaced parallel fingers extending axially towards the fixed element, and said synchronizer ring provided with a plurality of similarly disposed ribs, one for each finger and disposed normally in the path of movement of their associated fingers whereby as the splined element is advanced towards its clutching engagement with the fixed element the fingers come into contact with the ribs and act to shift the synchronizer ring into clutching engagement with the fixed element and permit the cams to force the ring into its clutching engagement with the fixed element on any subsequent relative rotary movement between the shaft and fixed element.

2. In a device of the class described, the combination of a spline shaft, an element of a mechanical clutch fixed relative to the axis of said shaft, a manually actuated mechanism including a clutch element splined to the shaft to turn therewith and adapted to be moved axially into mechanical clutching engagement with the relatively fixed element, means for causing the elements to approach the same speed before they are moved into their clutched relation, said means including a synchronizer ring mounted on the shaft between the elements and turning bodily with the shaft, camming means between the synchronizer ring and the shaft for shifting the synchronizer ring into clutching position said ring and the relatively fixed element provided with conical clutch faces coacting to provide a friction clutch of the cone type, said manually actuated mechanism and said synchronizer ring having rigid parts contacting at circumferentially spaced apart points and adapted to be moved into axially directed bearing engagement as the elements are moved towards their clutched position to cause the cone friction clutch to become operative.

3. In a device of the class described, the combination of two members mounted for rotary movement and movable axially relative to each other, means for causing the members to approach the same speed, said means including a friction clutch element movable into engagement with one of the members to form a friction clutch therewith and turning with the other member, said element and the other member provided with rigid axially extending fingers normally engaging with each other in endwise alignment as the members are moved relatively towards each other and acting therethrough to cause the element to move into its clutching engagement and thus frictionally connect the two members to drive one from the other and said fingers capable of shifting circumferentially to permit them to pass each other and thus permit the axial relative movement of said two members.

4. In a device of the class described, the combination of a shaft, two power members adapted to be moved into an interdriving relation, one of said members being slidably splined to the shaft and the other fixed axially, means for causing the two members to approach the same speed, said means including a synchronizer member turning bodily with the shaft, and having slight axial and rotary movement on the shaft and adapted to be shifted axially into clutching engagement with the axially fixed member, said slidable member and said synchronizer member having parts extending rigidly therefrom towards each other normally in axial alignment and engaging when the slidable member is moved towards the fixed member to shift the synchronizer member into its frictional engagement with the fixed member, the rigid parts projecting from the synchronizer member overlapping the splines on the shaft and means controlled by a relative rotary movement between the synchronizer member and the shaft for shifting said rigid parts circumferentially and thus permitting them to pass each other as the power members are moved towards their interdriving position.

5. In a synchronizing device, the combination of a shaft provided with splines terminating in cam forming edges, means providing a clutch including an axially fixed element and a coacting shiftable element slidably mounted on the shaft, said fixed element provided with a central recess, a combined clutch and camming ring constituting a synchronizer positioned between the elements of the clutch for causing the clutch elements to approach the same speed prior to being moved into clutching relation, said synchronizer including a relatively long bearing mounted for rotary movement on the shaft partially contained in said central recess and provided on one side with recesses coacting with the cams formed at the ends of the splines to shift the synchronizer axially towards the fixed element, said synchronizer provided with a clutch face adapted to be moved into a frictional clutching engagement with the fixed element, and said synchronizer provided with a rib overlapping the adjacent cam and disposed to be engaged by the shiftable element whereby the synchronizer is moved into a frictional engagement with the fixed element.

6. In a device of the class described, the combination of a shaft, a pair of clutch elements mounted for relative axial movement to and from a mechanical interclutching position, one of said elements provided with a bore with the end facing the other element enlarged and the other end reduced to form a bearing portion, the part between the enlarged and reduced portions of the bore forming a conical clutch face, synchronizing means for causing said elements to approach the same speed prior to being moved into their interclutching position, said means including a ring like member positioned on the shaft between the elements having a slight freedom of movement axially thereof, and having one end beveled and coacting with the conical clutch face to form a friction clutch of the cone face type between the synchronizer ring and the first named bored element, said ring member housed within the enlarged portion of the bore and provided with parts projecting axially towards the other element and adapted to be engaged thereby as the elements are shifted relatively towards each other to cause said other element to shift the ring member axially into position to cause the friction clutch to become operative and thus cause the ring member to turn with the first named bored clutch element.

HOWARD J. MURRAY.